United States Patent [19]

Gokee

[11] Patent Number: 4,947,704

[45] Date of Patent: Aug. 14, 1990

[54] SNAP ON STRAND ASSEMBLY

[75] Inventor: Donald J. Gokee, Bowling Green, Ohio

[73] Assignee: Babcock Industries Inc., Fairfield, Conn.

[21] Appl. No.: 398,143

[22] Filed: Aug. 24, 1989

[51] Int. Cl.[5] .............................................. F16C 1/10
[52] U.S. Cl. .................................. 74/502.4; 74/502.6; 403/70; 403/141
[58] Field of Search ................. 74/502.4, 500.5, 501.6, 74/502.6; 403/61, 70 X, 122, 141 X

[56] References Cited

U.S. PATENT DOCUMENTS

| | | | |
|---|---|---|---|
| 3,398,600 | 8/1968 | White et al. | 74/502.4 |
| 3,860,352 | 1/1975 | Carlson | 403/122 X |
| 4,482,265 | 11/1984 | Koza | 403/70 X |
| 4,499,785 | 2/1985 | Bennett et al. | 403/141 X |
| 4,546,666 | 10/1985 | Secord | 74/502.4 |
| 4,581,953 | 4/1986 | Walston et al. | 74/502.4 |
| 4,625,579 | 12/1986 | Spease | 74/502.4 |
| 4,656,880 | 4/1987 | Hildebrand et al. | 74/502.4 X |
| 4,694,705 | 9/1987 | Frankhouse et al. | 74/502 X |
| 4,790,206 | 12/1988 | Thomas | 74/502.4 |

FOREIGN PATENT DOCUMENTS

| | | | |
|---|---|---|---|
| 198143 | 6/1958 | Austria | 403/141 |
| 657849 | 3/1938 | Fed. Rep. of Germany | 403/141 |
| 660303 | 4/1938 | Fed. Rep. of Germany | 403/141 |
| 2810614 | 9/1978 | Fed. Rep. of Germany | 403/70 |

Primary Examiner—Vinh T. Luong
Attorney, Agent, or Firm—Barnes, Kisselle, Raisch, Choate, Whittemore & Hulbert

[57] ABSTRACT

A snap on strand assembly comprising a molded plastic body and a connecting strand molded in situ in said plastic body. The plastic body includes a cylindrical opening which closely engages a complementary cylindrical portion on a connector element which has a head spaced from the cylindrical portion. The plastic body further includes a frustoconical portion extending axially therefrom and a diametral slot dividing the frustoconical portion into two portions that snap below the head of the connector element. Radial tabs extend from the frustoconical portions to facilitate insertion of a tool for expanding the two portions to remove the body from the connector element.

3 Claims, 1 Drawing Sheet

U.S. Patent  Aug. 14, 1990  4,947,704
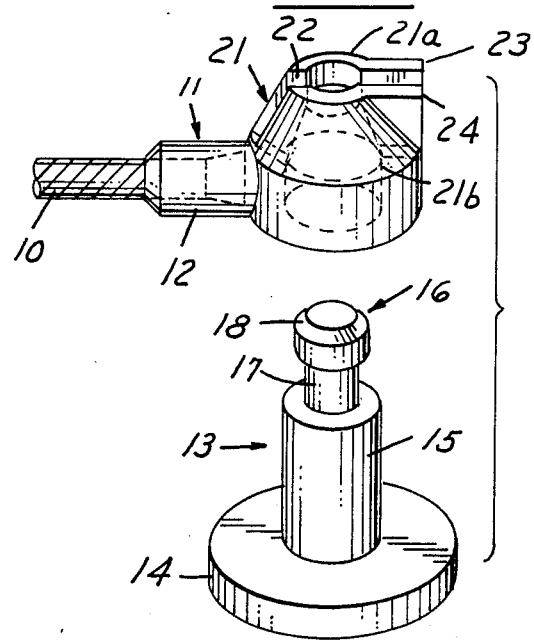
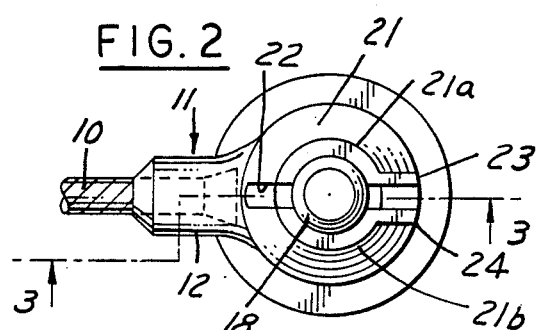
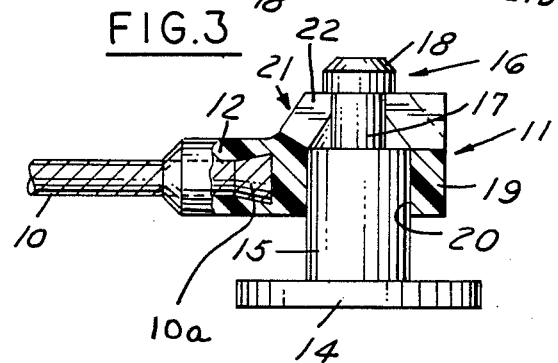

SNAP ON STRAND ASSEMBLY

This invention relates to cable control systems and particularly to cable control systems wherein a strand is adapted to be connected to a connecter element for relative rotation.

BACKGROUND OF THE INVENTION

In cable control systems comprising a flexible strand, it is common to provide connection between the cable and other control elements wherein relative rotation is desired. Typical patents showing such uses are U.S. Pat. No. 3,398,600 and 3,426,613.

Among the objectives of the present invention are to provide an assembly wherein the connection may be readily made by a snap on action; which can be done quickly; which is less costly; and which can be readily disassembled.

SUMMARY OF THE INVENTION

In accordance with the invention a snap on strand assembly comprises a molded plastic body and a connecting strand molded in situ in said plastic body. The plastic body includes a cylindrical opening which closely engages a complementary cylindrical portion on a connector element which has a head spaced from the cylindrical portion. The plastic body further includes a frustoconical portion extending axially therefrom and a diametral slot dividing the frustoconical portion into two portions that snap below the head of the connector element. Radial tabs extend from the frustoconical portions to its facilitate insertion of a tool for expanding the frustoconical portions to remove the body from the connector element.

BRIEF DESCRIPTION OF THE DRAWINGS

FIG. 1 is an exploded view of a snap on strand assembly embodying the invention.

FIG. 2 is a bottom plan view of the assembly.

FIG. 3 is a sectional view of the assembly taken along the line 3—3 in FIG. 2.

DESCRIPTION OF THE PREFERRED EMBODIMENT

Referring to FIGS. 1-3, the snap on strand assembly embodying the invention comprises a strand 10 which is connected to a plastic body 11 by being molded in situ in a radial portion 12 of the body. The end 10a of strand 10 is preferably enlarged, herein shown as having a frustoconical configuration with the greatest diameter at the free end. The body 11 is adapted to be associated with a connector element 13 that includes a base flange 14, a cylindrical portion 15, and a cylindrical head 16 connected to the portion 15 by a portion 17 of reduced cross section. The head 16 is formed with a bevel 18 to facilitate assembly, as presently described. The plastic body is made of a suitable plastic such as glass filled nylon.

The plastic body 11 includes a cylindrical body portion 19 that has a cylindrical opening 20 adapted to engage the portion 15 of the control element 13 and having close tolerances with respect there to. Plastic body 11 further includes a frustoconical portion 21 that is provided with a slot 22 dividing the portion into two portions 21a, 21b so that the body 11 can be snapped onto the connector element with the upper edges of the portions 21a, 21b engaging under the head 16. During the assembly, the tapered surface 18 facilitates the snap on action.

The portions 21a, 21b are preferably formed with radial tabs 23, 24 which can be used for insertion of a tool to disassemble the connection.

It can thus be seen that there has been provided an assembly wherein the connection can be readily made by a snap on action; which can be done quickly; which is less costly; and which can be readily disassembled.

I claim:

1. A snap on strand assembly comprising
 a molded plastic body,
 a connecting strand having an end molded in situ in said plastic body,
 said end of said strand embedded in said plastic body being enlarged,
 a connector element having a base flange, a cylindrical portion and a head,
 said plastic body including a cylindrical opening which closely engages said cylindrical portion on said connector element,
 said plastic body including a frustoconical portion extending therefrom and a diametral slot dividing the frustoconical portion into two portions that snap below the head of the connector element,
 said body having spaced radial tabs extending from the frustoconical portions to facilitate insertion of a tool for expanding the two portions to remove the body from the connector element.

2. The snap on strand assembly set forth in claim 1 wherein said enlarged end is generally frustoconical with a larger diameter at the end.

3. The snap on strand assembly set forth in claim 1 wherein said head is provided with a tapered surface to facilitate assembly of said body on said element.

* * * * *